(12) United States Patent
Furth et al.

(10) Patent No.: US 12,485,294 B2
(45) Date of Patent: Dec. 2, 2025

(54) BEAM SHAPING APPARATUS

(71) Applicant: Elekta Limited, Crawley (GB)

(72) Inventors: Mark Furth, Crawley (GB); Martin Broad, Crawley (GB); Antonio Cossu, Crawley (GB); Roberto Anselmi, Crawley (GB)

(73) Assignee: Elekta Limited, Crawley (GB)

( * ) Notice: Subject to any disclaimer, the term of this patent is extended or adjusted under 35 U.S.C. 154(b) by 263 days.

(21) Appl. No.: 18/000,609

(22) PCT Filed: Jun. 1, 2021

(86) PCT No.: PCT/EP2021/064723
§ 371 (c)(1),
(2) Date: Dec. 2, 2022

(87) PCT Pub. No.: WO2021/245109
PCT Pub. Date: Dec. 9, 2021

(65) Prior Publication Data
US 2023/0211180 A1    Jul. 6, 2023

(30) Foreign Application Priority Data

Jun. 2, 2020 (GB) .................................. 2008237
Sep. 16, 2020 (GB) .................................. 2014611
Oct. 19, 2020 (GB) .................................. 2016572

(51) Int. Cl.
*A61N 5/10*    (2006.01)

(52) U.S. Cl.
CPC ......... *A61N 5/1045* (2013.01); *A61N 5/1081* (2013.01); *A61N 2005/1095* (2013.01)

(58) Field of Classification Search
CPC .......... G21K 1/025; G21K 1/04; G21K 1/046; A61N 5/1045; A61N 5/1081;
(Continued)

(56) References Cited

U.S. PATENT DOCUMENTS 4,987,309 A * 1/1991 Klasen ................... G21K 1/046
250/492.1
5,012,506 A * 4/1991 Span ...................... G21K 1/046
378/150
(Continued)

FOREIGN PATENT DOCUMENTS

CN      110755762 A     2/2020
DE   102015210566 A1    12/2016
(Continued)

OTHER PUBLICATIONS

"United Kingdom GB2014611.4, Examination Report under Section 18(3) dated Jan. 20, 2023", (Jan. 20, 2023), 5 pgs.
(Continued)

*Primary Examiner* — David J Makiya
*Assistant Examiner* — Soorena Kefayati
(74) *Attorney, Agent, or Firm* — Schwegman Lundberg & Woessner, P.A.

(57) ABSTRACT

Disclosed herein is a radiation head for a radiotherapy device. The radiation head comprises a source of radiation configured to emit a beam of radiation; and beam shaping device for collimating the beam of radiation. The beam shaping device comprises a multi-leaf collimator; and a diaphragm positioned between the source and the multi-leaf collimator. The diaphragm comprises a diaphragm block movable along a curved path, the diaphragm block having a flat face focused on a focus point which is offset from the source of radiation.

20 Claims, 7 Drawing Sheets

(58) Field of Classification Search
CPC .......... A61N 5/1042; A61N 2005/1019; A61N 2005/1094; A61N 2005/1095; A61B 6/4092; A61B 6/06

See application file for complete search history.

(56) References Cited

U.S. PATENT DOCUMENTS

| | | | | |
|---|---|---|---|---|
| 5,144,647 | A * | 9/1992 | Kikuchi | G21K 1/046 378/150 |
| 2004/0013237 | A1* | 1/2004 | Brown | G21K 1/046 378/147 |
| 2006/0198492 | A1* | 9/2006 | Noguchi | G21K 1/04 378/15 |
| 2008/0205599 | A1* | 8/2008 | Hashimoto | G21K 1/046 378/148 |
| 2010/0166150 | A1* | 7/2010 | Perkins | G21K 1/046 378/150 |
| 2010/0281983 | A1* | 11/2010 | Dirauf | G01S 15/08 73/627 |
| 2011/0293071 | A1* | 12/2011 | Torsti | A61N 5/1048 378/152 |
| 2015/0131781 | A1* | 5/2015 | Ohashi | G01T 1/29 378/150 |
| 2015/0352376 | A1* | 12/2015 | Wiggers | A61B 6/586 378/207 |
| 2016/0071623 | A1* | 3/2016 | Schewiola | A61N 5/1045 378/152 |
| 2018/0133518 | A1* | 5/2018 | Harper | A61N 5/1049 |
| 2021/0031053 | A1* | 2/2021 | Zhao | A61N 5/1045 |
| 2021/0244970 | A1* | 8/2021 | Macdonald | A61N 5/1037 |

FOREIGN PATENT DOCUMENTS

| | | |
|---|---|---|
| JP | 2009160055 A | 7/2009 |
| WO | WO-2018093933 A1 | 5/2018 |
| WO | WO-2020257338 A1 | 12/2020 |

OTHER PUBLICATIONS

Das, Indra J., et al., "Beam characteristics of a retrofitted double-focused multileaf collimator", Medical Physics, vol. 25, Issue 9 (Sep. 1998); doi.org/10.1118/1.598348, (Oct. 23, 1998), pp. 1676-1684.

Karlsson, Magnus G., et al., "Treatment head design for multileaf collimated high-energy electrons", Medical Physics, vol. 26, Issue 10, Oct. 1999; doi.org/10.1118/1.598732, (Oct. 1, 1999), pp. 2161-2167.

"International Application Serial No. PCT/EP2021/064723, International Search Report dated Sep. 15, 2021", (Sep. 15, 2021), 3 pgs.

"International Application Serial No. PCT/EP2021/064723, Written Opinion dated Sep. 15, 2021", (Sep. 15, 2021), 5 pgs.

"United Kingdom Application Serial No. 2014611.4, Examination Report dated Feb. 26, 2021", (Feb. 26, 2021), 9 pgs.

Das, Indra J., et al., "Beam characteristics of a retrofitted double-focused multileaf collimator", Medical Physics 25.9, (1998), pp. 1676-1684.

Karlsson, Magnus G., et al., "Treatment head design for multileaf collimated high-energy electrons", Medical physics 26.10, (1999), pp. 2161-2167.

Ma, Chaoqiong, et al., "Flattening filter free in intensity-modulated radiotherapy (IMRT)-Theoretical modeling with delivery efficiency analysis", Medical physics 46.1, (2019), 34-44.

* cited by examiner

BEAM SHAPING APPARATUS

PRIORITY APPLICATIONS

This application is a U.S. National Stage Filing under 35 U.S.C. § 371 from International Application No. PCT/EP2021/064723, filed on Jun. 1, 2021, and published as WO2021/245109 on Dec. 9, 2021, which claims the benefit of priority to United Kingdom Application No. 2016572.6, filed on Oct. 19, 2020 and United Kingdom Application No. 2014611.4, filed on Sep. 16, 2020 and United Kingdom Application No. 2008237.6, filed on Jun. 2, 2020; the benefit of priority of each of which is hereby claimed herein, and which applications and publication are hereby incorporated herein by reference in their entireties.

FIELD

The present disclosure relates to a beam shaping apparatus for a radiotherapy device, and to a radiotherapy device comprising a beam shaping apparatus.

BACKGROUND

Radiotherapy involves the production of a beam of ionising radiation, usually x-rays or a beam of electrons or other sub-atomic particles. This is directed towards a cancerous region of a patient (e.g. a tumour), and adversely affects the cancerous cells, thereby reducing the prevalence thereof. The beam is delimited so that the radiation dose is maximised in the cancerous cells and minimised in healthy cells of the patient, as this improves the efficiency of treatment and reduces the side effects in a patient.

In a radiotherapy apparatus the beam can be delimited using a beam shaping apparatus which defines an aperture of variable shape to collimate the radiation beam to a chosen cross-sectional shape. A beam shaping apparatus can be formed by a combination of a diaphragm and a 'multi-leaf collimator' (MLC).

A multi-leaf collimator includes a plurality of leaves, each leaf being movable longitudinally so that its tip, or leading edge, can be extended into or withdrawn from the radiation beam. A multi-leaf collimator may include two opposing banks of leaves arranged face-to-face to narrow the aperture from opposing sides. The array of leaf tips can thus be positioned so as to define a variable edge to the collimator.

A diaphragm includes a solid block of radiopaque material such as tungsten, which has a front edge (leading inner edge) that spans the entire width of the device's aperture, and which can be advanced and/or withdrawn across the aperture in a direction transverse to the front edge (inner edge). A diaphragm may include two opposing diaphragm blocks which narrow the aperture from opposing sides, with the effect of adjusting the aperture as needed.

Usually, an aperture will be collimated by a pair of opposed diaphragm blocks operating in one direction (e.g. the x direction) and a pair of opposed multi-leaf collimator banks operating in the transverse direction (y direction), both directions being transverse to that of the beam (the z direction).

SUMMARY

Aspects and features of the present invention are described in the accompanying claims.

According to an aspect there is provided a radiation head for a radiotherapy device, the radiation head comprising: a source of radiation configured to emit a beam of radiation; and beam shaping device for collimating the beam of radiation, the beam shaping device comprising: a multi-leaf collimator; and a diaphragm positioned between the source and the multi-leaf collimator, the diaphragm comprising a diaphragm block movable along a curved path, the diaphragm block having a flat face focused on a focus point which is offset from the source of radiation. The beam shaping device defines an aperture. A diaphragm block can be described as a block, or a block collimator. As opposed to a multi-leaf collimator, a block collimator does not comprise individually movable leaves. Each block collimator extends across and defines the entire edge of the aperture, the full length of the field. That is, the block spans an edge of the aperture.

Optionally, the radiation head further comprises the diaphragm below the source of radiation and the focus point is above the source of radiation.

Optionally, the radiation head further comprises the focus point offset from the radiation source by a distance d.

Optionally, the radiation head further comprises the source configured to emit a beam of radiation that is directed along a beam axis and has a width transverse to the beam axis in a first direction and a second direction, wherein the diaphragm block selectively limits the width of the beam in the first direction. Each block extends across the entire edge of the aperture (in the second direction), the full length of the field. The block collimator may be movably attached to a chassis to selectively limit the width of the beam in the first direction.

Optionally, the radiation head further comprises a multi-leaf collimator for selectively limiting the width of the beam in the second direction.

Optionally, the radiation head further comprises the diaphragm block slidably attached to a curved rail which defines the curved path. The diaphragm block may be movably attached to a chassis.

Optionally, the radiation head further comprises the diaphragm comprising a first diaphragm block and a second diaphragm block defining opposing edges of an aperture to delimit the beam.

Optionally, the radiation head further comprises the first diaphragm block and the second diaphragm block movable along the same curved path and focused on the same focus point.

Optionally, the radiation head further comprises the source comprising a nominal disc, and at the maximum field angle the first block is focused on a first edge of the nominal disc and the second block is focused on a second edge of the nominal disc.

According to an aspect there is provided a radiotherapy apparatus comprising: a rotatable gantry; a radiation head according to any preceding claim, wherein the radiation head is fixedly attached to the rotatable gantry.

BRIEF DESCRIPTION OF THE DRAWINGS

Specific embodiments are described below by way of example only and with reference to the accompanying drawings in which.

OVERVIEW

It is desirable to provide a compact, lightweight and cost-effective, radiation head to fit in existing medical bunkers.

In a known beam shaping head, a field-defining diaphragm may be used to control the width of the field. The diaphragm blocks span the length of the field. In known systems the diaphragm block is positioned below the multi-leaf collimator, to adjust the width of the beam after it has been collimated by the MLC. Positioning the diaphragm in the space between the multi-leaf collimator and the radiation source reduces the height of the radiation head. However, having the diaphragm positioned closer to the source of radiation increases the penumbra caused by the diaphragm.

To provide a consistent size of penumbra, the diaphragm moves on a curved path.

In some aspects of the disclosure, to minimise the penumbra at wider angles the faces of the diaphragm are focused on a point which is offset from the source of radiation. This increases the distance between the source of radiation and the collimating edge at larger angles, hence reducing the penumbra.

In some aspects of the disclosure a diaphragm trimmer is fixedly attached to the diaphragm blocks and positioned below the multi-leaf collimator. This increases the distance between the source of radiation and the collimating edge, hence reducing the penumbra caused by the diaphragm.

In aspects of the present disclosure a worm drive is used to move the diaphragm block along a curved path. There is needed a reliable means for accurately moving the diaphragm on a curved path. A gear is fixedly attached to the block, and the teeth of the gear are engaged with a worm screw. A motor rotates the worm screw to drive the diaphragm block. The motor and worm screw are fixed and remain stationary.

A gear ratio can be chosen such that preventing rotation of the worm screw also prevents movement of the gear, hence locking the diaphragm in position. Therefore, additional holding breaks to fix the diaphragm in position are not required.

Specific Description of Certain Example Embodiments

As explained in the background section, beam shaping apparatuses are used to define an aperture to collimate a beam of radiation to a defined shape. The aperture may be created by a multi-leaf collimator and a diaphragm.

A radiotherapy device may comprise beam shaping apparatus such as a multi-leaf collimator and a diaphragm. The radiotherapy device may be suitable for delivering a beam of radiation to a patient in order to treat a tumour. An example of a radiation source for producing a therapeutic beam of radiation is a linear accelerator (linac). Clinical linac devices are configured to deliver high energy radiation to a patient.

Figure 1:
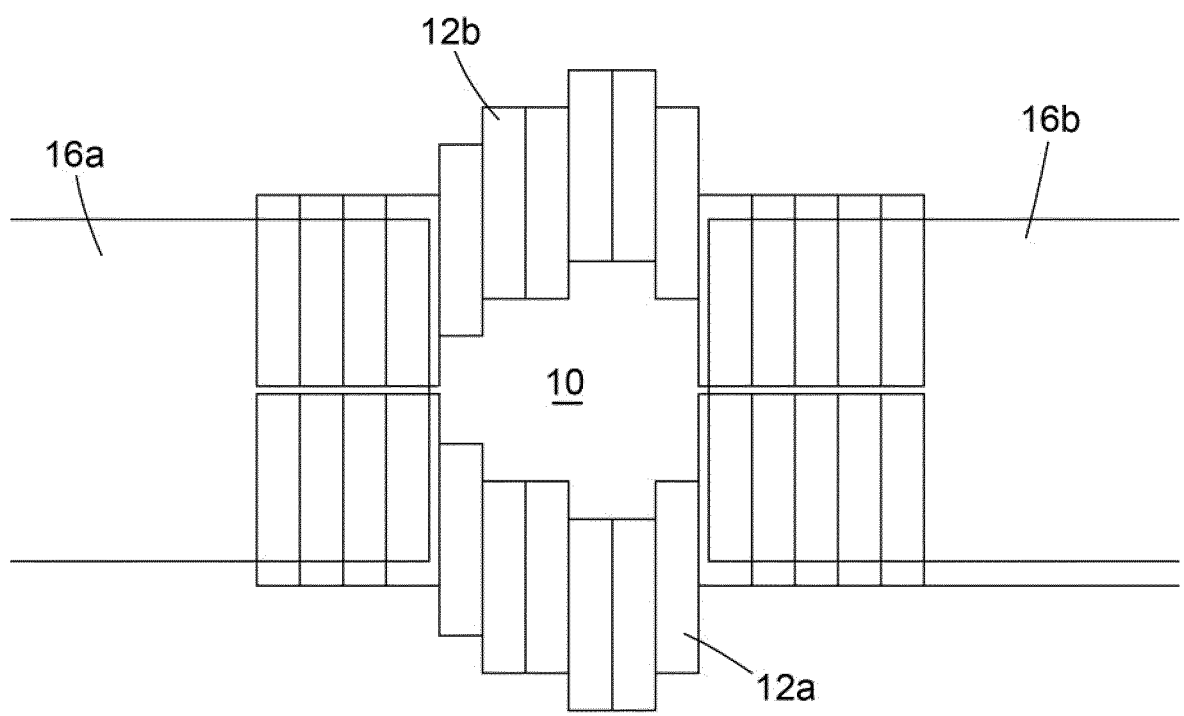
FIG. 1 illustrates a radiation beam shaped by a diaphragm and a multi-leaf collimator, viewed along the beam axis.

A view along the beam axis of an aperture 10 formed by a beam shaping device is shown in FIG. 1. The beam shaping device allows transmission of a beam which has a desired cross-section and provides complete shielding across the remainder of the beam field. The beam field is the maximum extent of the beam's cross section at any point along the beam axis. A multi-leaf collimator (MLC) 12 comprises a series of individually movable leaves of a radiopaque material such as tungsten, arranged side-by-side and movable relative to each other, in two opposing arrays 12a, 12b. The leaves are movable in the y direction to provide shaping of the beam.

The lower array 12a extends into the beam field in the y direction from one side of the field, and the upper array 12b extends into the beam field in the y direction from the opposing side of the field. The leaves can each be moved independently to define a chosen shape 10 between the tips of the opposing leaf banks 12a, 12b. Each leaf is thin in its transverse (x) direction to provide good resolution, is deep in the (z) direction to provide adequate absorption, and long in its longitudinal (y) direction to allow it to extend across the field to a desired position.

Generally, the longitudinal length of the leaf will be greater than its depth, and both will be much greater than its transverse thickness.

Movable diaphragm blocks, 16a and 16b adjust the width of the aperture. That is, the diaphragm blocks define the aperture in the x direction. The leaves of the MLC can be fully extended such that directly opposing leaves meet. Solely using the MLC to define the beam width would constrain the width of the aperture is to integer numbers of the width of the MLC leaves. The diaphragm blocks 16a, 16b can be moved in the x-direction as desired, and therefore provide an unconstrained dimension of the beam width. Further, the tips of the leaves of the MLC are curved and there may be some degree of leakage between the tips of directly opposing MLC leaves 12 from opposing banks 12a, 12b when fully extended to close off parts of the field. The diaphragm blocks 16a, 16b absorb radiation outside the desired width of the aperture to reduce leakage of the beam in locations outside the aperture.

The diaphragm includes a pair of solid blocks 16a and 16b of radiopaque material such as tungsten, which extend inwards in the x direction from the two opposing sides of the beam field. They have a front edge that spans the entire width of the field, and the entire width of the aperture, and which is straight (in the y-direction), and which can each be advanced and/or withdrawn independently across the field in a direction transverse to the front edge. Thus, the block collimators provide additional shielding in locations spaced from the field shape along the x direction, limiting inter-leaf leakage between the tips of opposing leaves and between adjacent leaves.

The width of the aperture is the dimension in the y direction. Each of the diaphragm blocks 16a, extends across the entire width of the aperture. The lead or inner edge of the diaphragm is straight in the y direction in the plane of the aperture.

Figure 2:
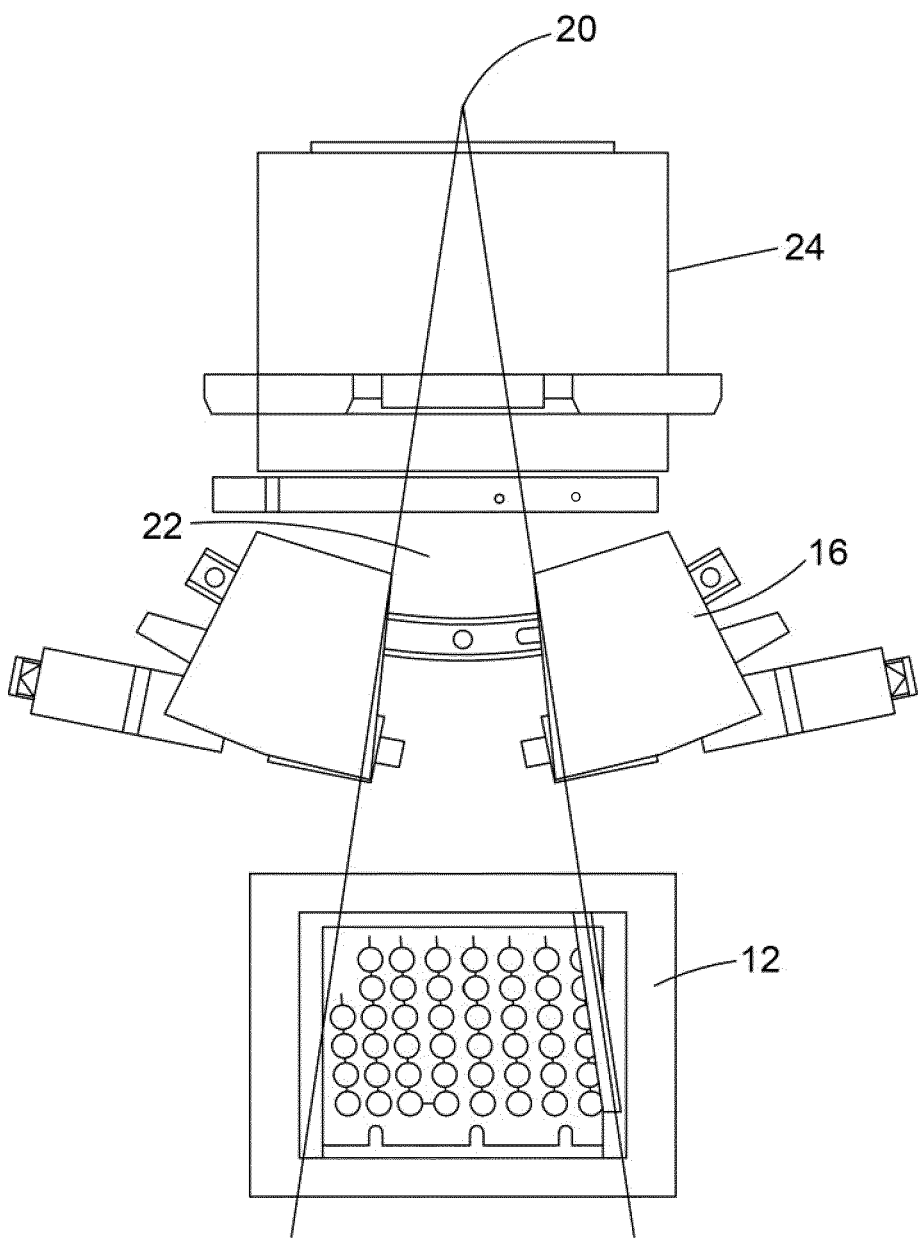
FIG. 2 illustrates a beam shaping apparatus according to the present disclosure.

FIG. 2 shows a radiation head having a beam shaping apparatus of the present disclosure. The beam shaping apparatus (along with the radiation source) forms part of the radiation head. In many radiotherapy systems the radiation head is rotated on a gantry around the patient, so that radiation can be delivered from different angles to minimise the radiation dose to healthy tissue. The radiation head rotates around an axis which is perpendicular to the beam axis. It is desirable to have a compact radiation head with a reduced height (also known as the 'stack height'), since this reduces the volume needed to house the radiotherapy device.

This means a smaller treatment room is required, and/or the radiotherapy device can fit into an existing treatment room.

Further, a more compact radiation heat means a shorter SAD (source-axis-distance) and consequently a higher dose rate. It is also desirable to have a more lightweight radiation head, since this enables higher rotational speeds of the gantry and consequently enables treatment techniques requiring high rotational speeds (such as breath-hold imaging and breath-hold delivery). Finally, reducing the amount of material (especially valuable material such as tungsten) in the radiation head is desirable for providing a cost-effective radiation head.

In the radiation head of FIG. 2, a radiation source 18 emits a beam of therapeutic radiation 20. In some implementations the radiation source 18 is a linear accelerator. The beam of therapeutic radiation is high energy x-rays, although in other implementation may be electrons or protons. The beam of radiation travels in the z direction and is collimated by a primary collimator and passes through an ion chamber below the primary collimator. The beam is then collimated by the beam shaping device 14. The beam shaping device 14 defines an aperture having a length in the y direction and a width in the x direction. The beam is collimated in the x-direction by a diaphragm 16, which has two diaphragms blocks 16a and 16b. The diaphragm blocks will be discussed in more detail below. The beam is collimated in the y-direction by a multi-leaf collimator 12. The leaves of the MLC travel in the y-direction, which is oriented out of the page of FIG. 2. The leaves provide a variable edge to the aperture.

The direction of travel of the leaves of the MLC 12 is perpendicular to the direction of travel of the diaphragm blocks 16. Together, the opposing leaf banks and opposing diaphragm blocks define an aperture with each of the four edges being defined by a leaf bank or a diaphragm block. The position of the block or leaves of the leaf bank defines the respective edge of the aperture, and resultingly the edge of the beam of radiation. Each diaphragm block extends across the entire edge of the aperture.

The radiation head comprises a head chassis (not shown) to which the components are attached in a fixed relationship.

As can be seen, the diaphragm 16 is positioned above the multi-leaf collimator 12. This can reduce the "stack height" weight and cost of the radiation head as discussed above. In previous systems the diaphragm is located below the multi-leaf collimator. In the present invention the diaphragm 16 is positioned between the multi-leaf collimator 12 and the source of radiation 18, such that the beam of radiation 20 travelling downwards in the z direction is first collimated by the primary collimator, then by the diaphragm 16 and is then collimated by the multi-leaf collimator 12.

Moving the diaphragm blocks above the MLC, to between the MLC and the source of radiation, presents a number of complications. In particular, the penumbra created by the diaphragm when closer to the source is increased.

The diaphragm blocks move on curved path so that the diaphragm blocks remain a fixed distance from the radiation source throughout their travel along the path. The provides a more consistent penumbra across the field. In use the movement of the diaphragm is linear in the x-direction to delineate the beam. From the point of view of the beam (such as the beam view shown in FIG. 1) the movement of the diaphragm block 16 is linear along the x-direction. The path is curved in the z-direction. Any penumbra created by the diaphragm blocks is larger at large field sizes. This is because the penumbra is proportional to the distance between the collimating edge and the treatment region. The treatment region lies in the x-y plane. Therefore, since the collimator moves on a curved path in the z-direction, at larger field angles the diaphragm blocks are further from the treatment region, meaning the collimating edge to treatment region distance is increased, as is the penumbra.

Moving the diaphragm blocks on a curved path is typically more difficult than moving diaphragm blocks on a straight path.

Having the diaphragm blocks above the MLC 12, rather than below, means that the diaphragm is closer to the source of radiation. The beam diverges along its axis and therefore with the diaphragm closer to the source, the required size and the length of travel of the diaphragm block is reduced. This is beneficial since tungsten is heavy and translating a tungsten block requires significant energy and robust components. The weight reduction achievable by placing the diaphragm blocks above the MLC, rather than below, can exceed a factor of 2.5. Further, using less tungsten means that a reduced volume of mounting hardware is required, as well as considerably reduced cost and environmental impact. The cost of the shielding material (tungsten alloy) constitutes a significant portion of the overall cost of the beam shaping head (for example from 25% to 50%). Therefore reducing the amount of shielding material required reduces the cost of the beam shaping head.

It is desirable to provide a compact radiation head to fit in existing medical bunkers. Positioning the diaphragm in the space between the multi-leaf collimator and the radiation source reduces the height of the radiation head. However, having the diaphragm positioned closer to the source of radiation increases the penumbra caused by the diaphragm.

A number of features are shown in the figures and disclosed herein which provide a compact beam shaping head by moving the diaphragm above the MLC, whilst maintain high performance of the beam shaping head. The features and embodiments disclosed herein my be used in separate embodiments. Alternatively, the features may be combined in any conceivable manner.

Defocused Diaphragm

To provide a consistent size of penumbra, the diaphragm moves on a curved path. In some aspects of the disclosure, to minimise the penumbra at wider angles the faces of the diaphragm are focused on a point which is offset from the source of radiation. This increases the distance between the source of radiation and the collimating edge at larger angles, hence reducing the penumbra.

As explained above, each diaphragm block defines an opposing edge of the aperture. A drive means moves the diaphragm block along its curved path into the beam to a greater and lesser extent to adjust the width of the aperture.

Each diaphragm block produces a penumbra at the edge of the collimated beam of radiation. The size of the penumbra at the treatment region is proportional to the distance between the collimating edge (the part of the diaphragm block which defines the edge of the aperture) and the treatment region, and is inversely proportional to the distance between the source and the collimating edge. The collimating edge is the section or point of the diaphragm block which extends furthest into the cross section of the beam.

It is desirable to minimise the penumbra at the treatment region. A small penumbra is critical for the shielding of vital organs near the tumour being irradiated. By moving the diaphragm closer to the source of radiation, the distance between the collimating edge and the source decreases, which increases the penumbra.

Each diaphragm block has a flat inner face, which remains facing or directed towards a focus point throughout the travel of the diaphragm block along its curved path. In known systems the focus point is the centre of the source of radiation, meaning that the flat face is directed towards the centre of the radiation source at all field angles. Physics simulations of the penumbra for the focused diaphragm blocks have concluded that the width of the penumbra remains unsatisfactory, particularly in large field sizes.

In the present invention the diaphragm is defocused from the source of radiation. That is, the flat faces of the diaphragm blocks are focused on a point which is offset from the source of radiation.

By focusing the diaphragm blocks on a point which is removed from the source of radiation, the inventors in the present application have realised the penumbra caused by the diaphragm in delivery of radiotherapy is reduced at non-zero field angles.

FIG. 3

Figure 3:
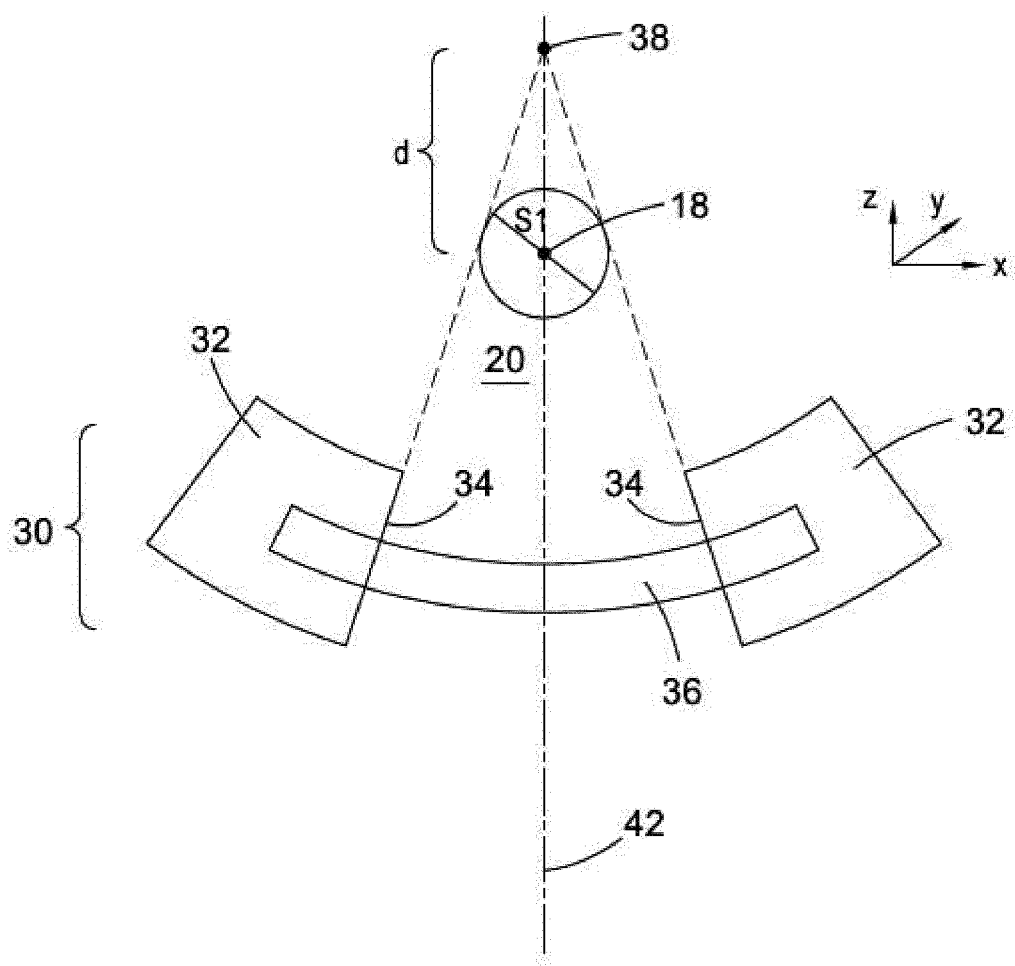
FIG. 3 illustrates a diaphragm according to the present disclosure.

FIG. 3 shows the relationship between the diaphragm and the source of radiation according to an aspect of the present disclosure.

A source of radiation 18 emits a beam of radiation 20 with a beam axis along the z direction. The beam has a cross section which is collimated in the x-direction by the diaphragm as explained above in relation to FIG. 2. The diaphragm 30 comprises two diaphragm blocks 32 (corresponding to the diaphragm blocks 16 in FIG. 2) which move along a curved path 36. In the implementation in FIG. 3 the curved path 36 is a rail which defines the path along which the diaphragm blocks move. The diaphragm blocks are moved along the curved path in order to define the width of the aperture.

Each diaphragm block has a flat inner face 34. The inner face 34 is focused on (i.e. directed or pointed towards) a focus point 38 throughout the travel of the diaphragm block along the curved path 36. The flat face moves radially around the focus point. As the position of the diaphragm block changes, the face tilts relative to the z axis in the radiation head, yet remains directed towards the focus point at all stages of travel along the curved path.

The centreline 42 is the line between bottom-most point of the curved path (referred to herein as the centre point) and the focus point. The source of radiation 18 is centered on the centreline 42, such that the centre point is aligned with the centre of the beam.

The diaphragm blocks have a closed position, in which the faces of the diaphragm blocks meet. This creates an aperture with zero width—i.e. substantially all of the radiation is blocked out. In the closed position usually the diaphragm blocks meet at the centreline 42. It is, however, conceivable that the diaphragm blocks meet at a different point on the curved path.

Field angle refers to the position of the diaphragm block along the curved path, specifically to the degree to which the block is positioned away from the centreline. Zero field angle is the inner face of the diaphragm block positioned on the centreline, and maximum angle corresponds to the diaphragm block located at the end point of the curved path. A wide field corresponds to the blocks positioned away from the centreline near to the edge of the maximum beam field.

As the field angle of both blocks increases and the blocks 32 move out from the centreline, the width of the aperture formed by the diaphragm blocks increases. The maximum aperture size is provided when both diaphragm blocks are located at their respective "end points" of the curved path. This is the position shown in FIG. 3.

The focus point 38 is offset from the source of radiation 18 by a distance d. The focus point 38 is positioned above the source of radiation 18, and the diaphragm is positioned below the source of radiation. The effect this offset d has on the beam of radiation is illustrated in FIG. 4.

FIG. 4

Figure 4:
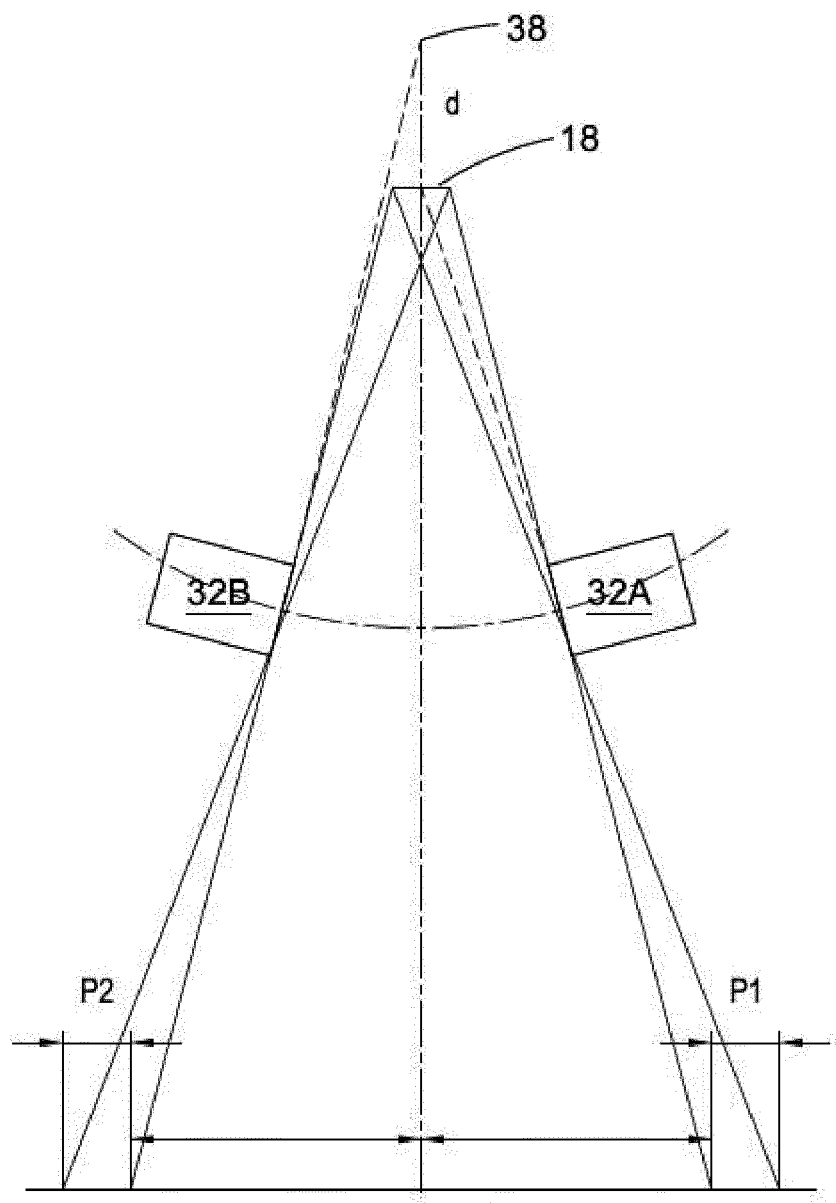
FIG. 4 illustrates the penumbra created in a beam of radiation.

FIG. 4 illustrates the penumbra created in a beam of radiation 20 from a source of radiation 18 collimated by diaphragm blocks in an open position away from the centreline. The source of radiation 18 and the diaphragm 30 are comprised in a radiation head. The diaphragm block 32A on the right-hand side is focused on a point at the centre of the source of radiation. This arrangement would result if the source is modelled as a point source. The flat face 34A of the block 32A is directed towards point at the centre of the radiation source at all field angles. The diaphragm block 32B on the left-hand side is defocused from the source of radiation, meaning that the focus point of the diaphragm block 32B is offset from the source of radiation. The source of radiation is modelled as a disc, and the focus point of the diaphragm block is located a distance d above the disc. In radiotherapeutic radiation produced, for example, by a linear accelerator, source can modelled as a flat disc, or 'spot' of multiple sources, the disc having a diameter S1.

The spot size (diameter) is determined by calculation. The spot position is normally on the inside face of the waveguide output window. The radiation spot size and position can change as the energy is increased.

The radiation source 18 emits a beam of radiation 20 comprising x-rays which travel away from the source. The radiation beam is illustrated by dashed lines.

On the right-hand side of FIG. 4, radiation from the far side (i.e. left side) of the disc is collimated by the upper most part of the face of the diaphragm block 32A. Radiation from the near side (i.e. right side) of the disc is collimated by the lower-most part of the face of the diaphragm block 32A. The width of the penumbra created by the diaphragm block is illustrated as P1. Both the uppermost part and the lowermost part of the inner face define the aperture. The collimating edge therefore can be taken as a point between the uppermost and lowermost parts (i.e. where the two dashed lines cross).

The diaphragm block 32B is defocused from the source of radiation 18, as in an embodiment of the present disclosure. The focus point 38 of the diaphragm block 32B is located above the source of radiation 18, offset from the source by a distance d. The focus point 38 is positioned directly above the source of radiation 18 such that the source of radiation lies on the centreline. When the diaphragm block 32B is positioned with it's inner face on the centreline, the face 34B is directed towards the centre of the source.

When a diaphragm block is positioned away from the centreline, as shown in FIG. 4, the inner flat face 34B is directed to a point which is offset from the source, and not towards the centre of the source.

The face is directed to a point above the source of radiation 18, and therefore the lower portion of the diaphragm block extends into the beam by a greater amount than the upper portion. The diaphragm block presents its lowermost edge to the radiation source. As can be seen in FIG. 4, the uppermost edge is no longer defining an edge of the penumbra the overall width of the penumbra is reduced. Radiation from both the near side (left side) and the far side (right side) of the disc is collimated by the lowermost part of the inner face 34B, creating a penumbra P2.

The lowermost part of the inner face is the collimating edge. Therefore by defocusing the diaphragm block from the centre of the source of radiation, effectively the distance between the source and the collimating edge is increased. The distance between the source and the collimating edge of block 32A is A, and the distance between the collimating edge of block 32B is distance B. By defocusing block 32B, B>A. It can be seen that the penumbra P2 is smaller than the penumbra P1.

When an angle is introduced between the face of the diaphragm block and the direction of the radiation, the collimating edge changes. If the face is focused on a point positioned on the opposite side of the source to the diaphragm, the point which defines the edge of the aperture moves further away from the source.

As explained above, the penumbra caused by the diaphragm block is inversely proportional to the distance between the source of radiation and the collimating edge. In FIG. 4

$$P1 \propto \frac{1}{A}$$

$$P2 \propto \frac{1}{B}$$

By defocusing the diaphragm from the source of radiation, the distance between the source of radiation and the collimating edge is increased at non-zero field angles.

$B>A$

It therefore follows that $P2<P1$

That is, by focusing the diaphragm blocks on a point above the source of radiation, the penumbra produced by the blocks at non-zero field angles is reduced.

In the present disclosure a simple offset between the source of radiation and the focus point of the diaphragm is introduced which reduces the penumbra at non-zero field angles. The effective distance between the source and the collimating edge increases without having to increase the distance between the diaphragm and the source. This means that the penumbra can be reduced without increasing the stack height of the radiation head.

The diaphragm blocks provide two opposing faces moving on the same curved path and focused on the same focus point. In the closed position the diaphragm blocks meet with parallel faces and the beam is blocked by the full depth of the diaphragm blocks. This blocks substantially all of the radiation. Accordingly the diaphragm's ability to block radiation is not compromised. The radiation head provides a reduced penumbra without compromising the diaphragm's ability to block radiation.

In summary, by moving the focus point of the diaphragm above the source of radiation, the distance between the collimating edge and the source at non-zero field angles is increased, and therefore the penumbra caused by the diaphragm block is decreased.

Finding the Optimum Focus Point

The optimum location of the focus point can be determined by modelling the source of radiation as a disc. At the maximum field angle the face of each diaphragm block is focused on the edge of a nominal flat disc. The intersection of the lines of focus of the diaphragm blocks in this position is the focus point for the diaphragm.

The source is modelled as a flat disc having a nominal diameter. In FIG. 3 the source 18 is simulated as a flat disc of multiple sources, the disc having a diameter S1. The simulation estimates the diameter of the radiation source, which is dependent on beam energy. At the maximum field angle, i.e. with the diaphragm block positioned at the end point of the curved path, the inner face 34 of the diaphragm block is focused on the edge of the nominal disc of the source. This is the 'end point focus line'. Each diaphragm block has an 'end point focus line' at its maximum field angle at its respective end of the curved path. The optimum focus point for the diaphragm blocks along the curved path is the intersection of the two end point focus lines. The end point might correspond to the maximum required field size of the treatment beam, rather than, for example, the physical end of the curved path.

The focus point 38 is displaced from the source 20 by a distance d. Using the above method: the larger the nominal disc of the source, the larger the distance between the focus point and the source, the greater the offset. If the source is modelled as a point source (as in known systems) the 'nominal diameter' of the source is zero, meaning that the focus point lies on the source.

The corrected focusing point is now behind the radiation source, the point is optimised for the radiation source and the required projected field size. An initial value for D can be calculated by trigonometry from the radiation spot diameter, distance from source to the isocentre and maximum projected field size. The distance could then be fine-tuned using monte-carlo simulation.

It is noted that, in a defocused diaphragm the full depth of the block is not presented into the radiation beam, only its lower edge. Therefore the amount that each block of a defocused diaphragm is extended into the radiation beam to attenuate the beam to a specific field size is required to be greater than that of the block focused at the centre of the radiation source.

Trimmers

Figure 5:
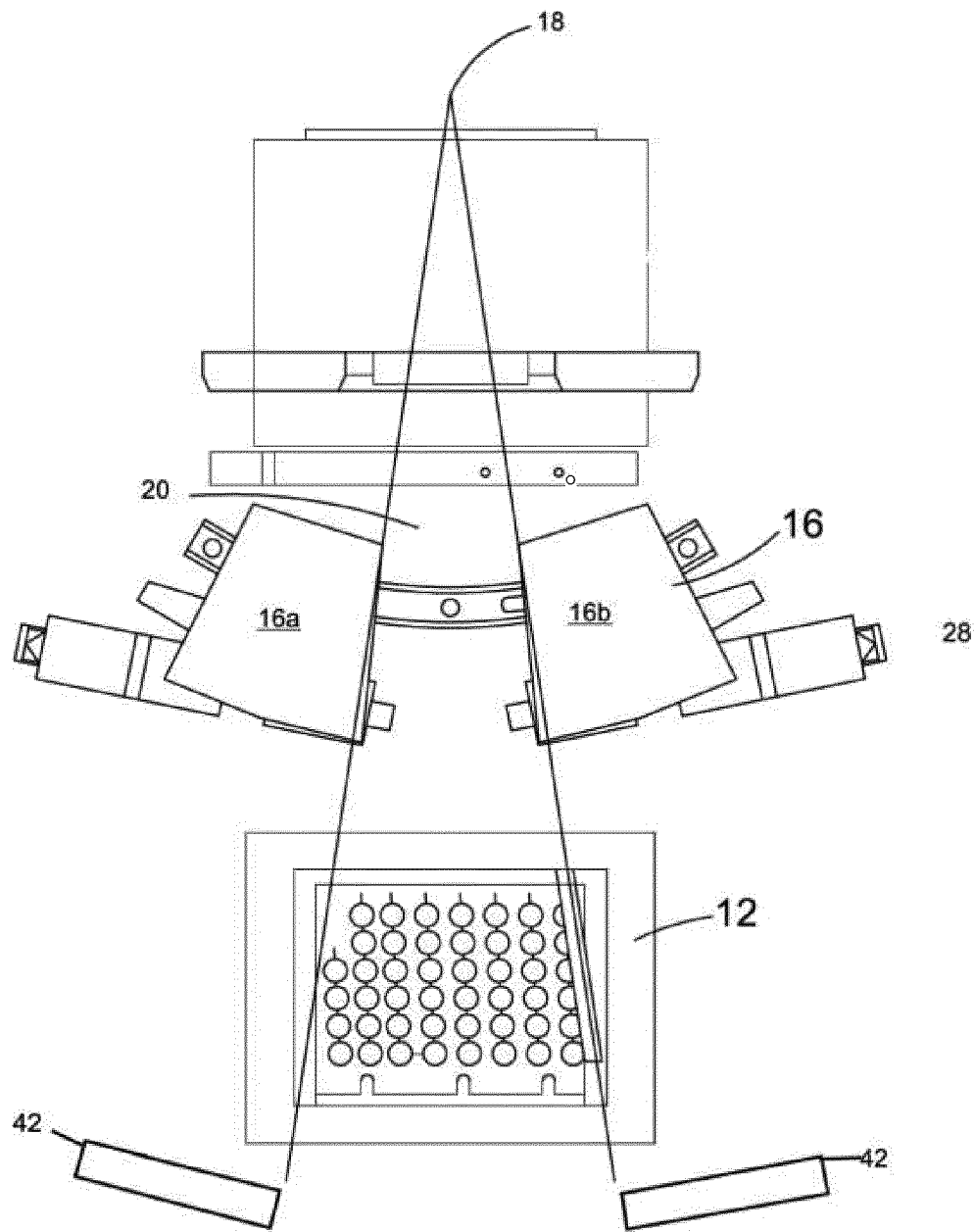
FIG. 5 illustrates a beam shaping apparatus according to the present disclosure.
Figure 6:
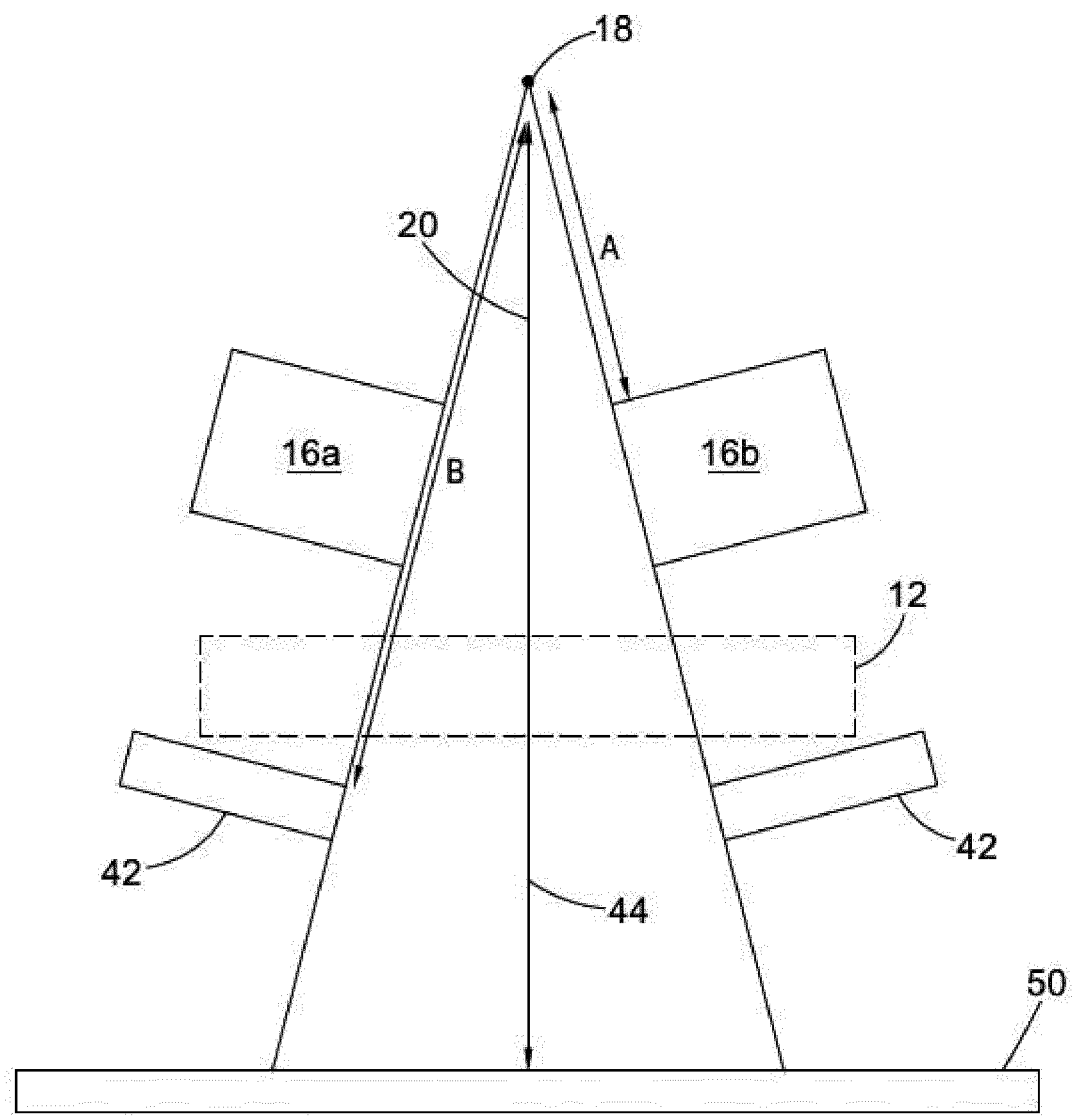
FIG. 6 illustrates a diaphragm according to the present disclosure.

Another embodiment is disclosed in FIGS. 5 and 6. Features from FIGS. 5 and 6 may be provided alone, or may be provided in combination with features from other embodiments, such as features from FIG. 3, 4 or 7.

As explained above, each diaphragm block defines an opposing edge of the aperture 10 (FIG. 1). A drive means moves the diaphragm block into the beam to a greater and lesser extent to adjust the width of the aperture.

Each diaphragm block produces a penumbra at the edge of the collimated beam of radiation. A penumbra is the region where intensity falls off rapidly at the beam edge, between an intensity of 20-80% of the central beam axis. It is desirable to minimise the size of the penumbra region in the beam at the treatment region. Penumbra is a key factor for minimizing unwanted irradiation on healthy tissues surrounding the target volume being irradiated.

The size of the penumbra at the treatment region increases with the distance between the collimating edge and the treatment region, and decreases with the distance between the source and the collimating edge. The collimating edge is the section of the diaphragm block which extends furthest into the cross section of the beam and defines the edge of the aperture.

By moving the diaphragm above the multi-leaf collimator, as shown in FIG. 2, the diaphragm is closer to the source of radiation and the distance between the collimating edge of the diaphragm and the source decreases. This increased the penumbra caused by the diaphragm.

In the present invention penumbra trimmers are used to reduce the penumbra at the treatment region caused by the diaphragm. A trimmer is an attenuating bar which can be extended into and out of the beam in unison with the diaphragm block. A trimmer is associated with each diaphragm block. The trimmer is positioned to attenuates the beam in the penumbra region (the region of the penumbra caused by the diaphragm. The trimmer is further from the source than the diaphragm block, therefore the penumbra produced by the trimmer is smaller than the penumbra produced by the diaphragm block.

The trimmer is fixedly attached to the diaphragm block, such that movement of the diaphragm block causes corresponding movement of the trimmer. The collimating edge, or inner face, of the trimmer (the point of the trimmer which extends furthest into the beam) is aligned with the collimating edge of the diaphragm block to match the divergence of the beam. The trimmer is moved in unison with the diaphragm block so as to collimate the beam to the correct degree. Each trimmer is fixedly attached to the respective diaphragm block.

FIG. 5

FIG. 5 illustrates trimmers 42. Each trimmer, 42a and 42b, is associated with a respective diaphragm block 16a and 16b. In FIG. 5 the trimmers are fixedly attached to the diaphragm blocks 16. The trimmers may be directly attached to the block, or may be attached to a different component which is fixedly attached to the block.

In principle the block and trimer could be a single part. In one implementation the trimmer and blocks are manufactured as two separate elements (block and trimmer) and connected by a rigid arm. In one implementation the arm is made by steel or similar. This reduces the complexity of manufacturing and is a more cost-effective arrangement.

The trimmers are from tungsten, tungsten alloy, or from another heavy metal. In some implementations the trimmers are made for the same material as the diaphragm blocks. Conventional diaphragm blocks typically have a thickness of 7 to 8 cm. The use of a trimmer means the thickness of the diaphragm block can be reduced, depending on the thickness of the trimmer. In one example the trimmers have a thickness of around 1 cm compared to the diaphragm block thickness of around 6 cm. The trimmers are sufficiently thin to have negligible impact on the dimensions of the device.

In the implementation in FIG. 5, a drive means 28 drives the block 16 along a path to define the edge of an adjustable aperture. In the device in FIG. 5 the drive means comprises a worm screw and a motor. The motor drives the block 16 via engagement of the worm screw with the gear. In use the motor rotates the worm screw which in turn drives the gear. The gear is fixedly attached to the block, and therefore rotating the worm screw drives the diaphragm block 16 along a curved rail 26 which defined the path of travel of the diaphragm block.

The trimmer 42 is fixedly attached to the block 16. The trimmer may be directly attached to the block 16, or may be indirectly attached to the block, such as being fixedly attached to the gear. Since the gear is fixedly attached to the block, movement of the gear causes movement of the block and the trimmer.

The diaphragm blocks 16 and the trimmers 42 each move along respective paths in and out of the beam to a greater and lesser extent, hence defining the width of the aperture. The leading edge of the trimmer 42—the point which extends furthest into the cross section of the beam—is aligned with the leading edge of the diaphragm block 16. The trimmer 42 is fixedly attached to the diaphragm block 16 such that the two are held in a fixed relationship.

The drive means 28 moves the diaphragm block 16 along its path to define the aperture. Since the trimmer 42 is fixedly attached to the diaphragm block 16, movement of the diaphragm block 16 causes corresponding movement of the trimmer 42. That is, the drive means 28 drives movement of the diaphragm block 16 and of the trimmer 42 in unison. Both the trimmer and the diaphragm block 16 are moved along their respective paths by the same degree of movement. The movement may not be the same linear distance, but takes into account the divergence of the beam so that the degree to which the block and trimmer extend into the cross section of the beam is the same.

Since the trimmer 42 is held in a fixed position relative to the drive means 28, the leading edge of the trimmer 42 is always aligned with the leading edge of the diaphragm block 16. The collimating edge of the trimmer is always correctly positioned to collimate the penumbra of the beam.

The diaphragm blocks move on curved path and the faces of the diaphragm blocks remain focused on a focus point at all points along the curved path. In use the movement of the diaphragm is linear in the x-direction to delineate the beam. From the point of view of the beam (such as the beam view shown in FIG. 1) the movement of the diaphragm block 16a, 16b is linear along the x-direction. The path is curved in the z-direction. The trimmer is attached to the diaphragm block and also moves on a curved path, with the trimmer faces focused on the diaphragm focus point. The trimmers are positioned further from the source than the diaphragm blocks and therefore the trimmers move on a path which takes into account divergence of the beam.

In a different implementation, the trimmers are not fixedly attached to the diaphragm block and a separate drive means is used to move the trimmers. For example, each trimmer is controlled by a respective trimmer drive. In this implementation the trimmer drive is controlled to engender movement of the trimmer to the correct position to align the face of the trimmer with the face of the diaphragm block. In some embodiments the trimmer drive is a motor which drives the trimmer block along the trimmer path to the correct position.

The diaphragm block is driven to the position that defines the required treatment field. The trimmer is driven to the position that defines the required treatment field, with a certain offset. The offset is function of the field opening and determined by analysis and/or measurements as the relative position between block and trimmer having the effect of minimizing the penumbra.

The trimmer drive and the diaphragm block drive means are both controlled by a controller. The controller sends signals to the trimmer drive and the diaphragm block drive means to control the position of the trimmer and diaphragm block respectively. The control signals contain correlated instructions to ensure the trimmer moves in synchronisation with the diaphragm block to align the faces of the trimmer and block in the radiation beam.

In FIG. 5 the diaphragm blocks move on a curved path. However, in other implementations each diaphragm block moves on a straight path and each trimmer moves on a straight path. In another implementation, the diaphragm blocks move on a curved path and the trimmers move on a straight path.

It is desirable to provide a compact, lightweight and cost-effective radiation head to fit in existing medical bunkers. Positioning the diaphragm closer to the radiation source reduces the dimensions of these elements, however, having the diaphragm positioned closer to the source of radiation increases the penumbra caused by the diaphragm.

In some aspects of the disclosure a diaphragm trimmer is fixedly attached to the diaphragm blocks and positioned below the multi-leaf collimator. This increases the distance between the source of radiation and the collimating edge, hence reducing the penumbra caused by the diaphragm.

As explained above the penumbra of the beam should be as small as possible in order to protect healthy tissue adjacent to the target from unnecessary radiation while ensuring the required dose on the target.

FIG. 6 shows a radiation head of the present disclosure, and the impact of the penumbra trimmers on the collimated beam of radiation.

A source of radiation 18 emits a beam of radiation 20 with an axis along the z direction. The beam is collimated by the diaphragm 16 to achieve a desirable cross-section. The diaphragm 16 comprises two diaphragm blocks 16a, 16b which are moved to selectively define the width of the aperture.

As explained above, the penumbra caused by the diaphragm block decreases with the distance between the source of radiation and the collimating edge. The diaphragm blocks are positioned between the source of radiation and the multi-leaf collimator. Geometric penumbra is an approximation which can follow the following working principle:

$$P \approx \frac{S(SSD - SCD)}{SCD}$$

Where:
S is the source size (the width of the source in FIG. 6)
SSD is the source to skin distance (44 on FIG. 6)
SCD is the source to collimator distance (A or B on FIG. 6)

As can be seen in FIG. 6, the distance between the diaphragm and the source of radiation is A. In a beam collimated by a diaphragm block $$P_A \approx \frac{S \times (SSD - SCD_A)}{SCD_A}$$

The diaphragm trimmers are positioned below the multi-leaf collimator, a distance B from the source of radiation. In a beam collimated by the trimmer $$P_B \approx \frac{S \times (SSD - SCD_B)}{SCD_B}$$

The diaphragm trimmers are positioned further from the source of radiation than the diaphragm blocks, distance B is greater than distance A.

$$SCD_B > SCD_A$$

It therefore follows that $$P_{B(Trimmer)} < P_{A(Diaphragm)}$$

It is clear therefore that the penumbra of a beam collimated by the trimmers is smaller than the penumbra of a beam collimated by the diaphragm blocks.

The diaphragm block 16 creates a penumbra in the collimated beam. The trimmers diaphragm blocks and are positioned below the diaphragm blocks. When the beam reaches the trimmers it has already been collimated by the diaphragm blocks. The face of each trimmer is aligned with the face of the diaphragm block above it and with the edge of the aperture, or the central region of the beam. The trimmers lie in the penumbra regions created by the diaphragm blocks (the penumbras are outside the central region of the beam). The overall effect is to reduce the penumbra in the radiation beam. Using the trimmers to collimate the beam after the diaphragm blocks reduces the penumbra at the treatment location.

Further, the stack height of the radiation head is not increased, or is not substantially increased, by the inclusion of the trimmers.

Therefore the diaphragm trimmers in the radiation head of the present disclosure positioned below the multi-leaf collimator reduce the size of the penumbra in the beam of radiation whilst maintaining a reduced stack height.

Worm Drive

Figure 7:
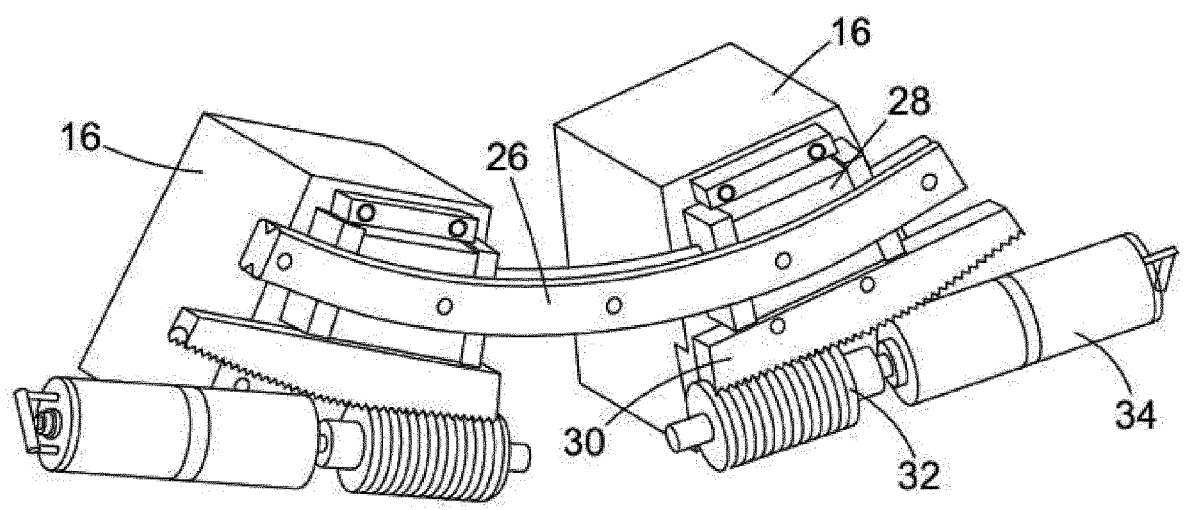
FIG. 7 illustrates a diaphragm according to the present disclosure.

Another embodiment is disclosed in FIG. 7. Features from FIG. 7 may be provided alone, or may be provided in combination with features from other embodiments, such as features from FIG. 3, 4, 5 or 6. The diaphragm blocks in FIGS. 3 to 6 may be driven by the worm drive illustrated in FIG. 7.

As explained above, it is desirable to provide a compact radiation head to fit in existing medical bunkers. Positioning the diaphragm in the space between the multi-leaf collimator and the radiation source reduces the height of the radiation head. However, having the diaphragm positioned closer to the source of radiation presents a number of complications. To provide a consistent size of penumbra, the diaphragm moves on a curved path centred on the radiation source. There is needed a reliable means for accurately moving the diaphragm on a curved path.

In some aspects of the present disclosure a worm drive is used to move the diaphragm block along a curved path. A gear is fixedly attached to the block, and the teeth of the gear are engaged with a worm screw. A motor rotates the worm screw to drive the diaphragm block. The motor and worm screw are fixed and remain stationary.

A gear ratio can be chosen such that preventing rotation of the worm screw also prevents movement of the gear, hence locking the diaphragm in position. Therefore, additional holding breaks to fix the diaphragm in position are not required.

FIG. 7 shows a diaphragm according to the present disclosure.

The diaphragm comprises two diaphragm blocks 16a, 16b. The diaphragm blocks 16a, 16b move along a curved rail 26. The curved rail has a curvature centred around a point. When the diaphragm is used in a radiotherapy device, the diaphragm is positioned such that the curvature of the rail is centred on the source of radiation. The curved rail 26 defines the curved path along which the diaphragm block moves.

A slide 28 is affixed to each block to slideably attach the block 16a to the curved rail 26. That is, the slide 28 attaches the diaphragm block to the rail 26 such that the diaphragm block is able to move backwards and forwards along the rail 26. In use, moving the diaphragm block along the rail moves the block into and out of the beam of radiation to a greater and lesser extent. In this way, the location of the diaphragm block along the rail defines the edge of the aperture and the edge of the beam of radiation.

The slide 28 includes ball bearings which are positioned in a channel in the rail. The channel is shaped to hold the slider and the rail together. An end stop on the rail prevents the slide from sliding off the end of the rail.

In use the diaphragm moves on a linear path in the x-direction to delineate the beam. The path is curved in the z-direction. From the point of view of the beam (such as the beam view shown in FIG. 1) the movement of the diaphragm block 16a is linear along the x-direction.

There is provided a drive mechanism to drive the diaphragm along the curved path. Each diaphragm block has a gear 30, such as a quadrant gear, fixedly attached to the block 16a. The gear may be attached directly to the block 16a, or may be attached to the slide 28.

A worm screw 32 and a motor 34 drive the block 16 via engagement of the worm screw 32 with the gear 30. The teeth of the gear 30 are engaged with the threads of the worm screw 32. In use the motor 34 rotates the worm screw 32 which in turn drives the gear 30. The gear 30 is fixedly attached to the block 16, and therefore rotating the worm screw 32 drives the diaphragm block 16 along the curved rail 26.

The worm screw and gear can be of the conventional type or of a double enveloping design which has the potential to reduce system backlash and increase component life. In a double envelope worm gear the worm profile is curved to match the radii of the gear wheel. The profile of the thread form on the worm wheel stays tangential to teeth on the gear wheel.

The gear 30 engages with the linear worm screw 32. The curvature of the quadrant gear 30 means that rotation of the linear worm screw 32 causes movement of the block along a curved path.

The motor 34 is fixedly attached in the radiation head. The motor 34 remains stationary in the frame of the radiation head and relative to the rail 26 when driving the diaphragm block along the curved rail 26. The beam shaping device has a chassis (not shown in FIG. 2) holding the multi-leaf collimator and the diaphragm in a fixed relationship. The rail 26 and the motor 34 are attached to the chassis, either directly or indirectly, in a fixed relationship. The worm screw 32 remains fixed in the radiation head, aside from rotation around its longitudinal axis.

For a compact design, and to minimise bending moments on the rail, it is necessary to keep the centre of mass of the diaphragm as close to the rail as possible. Although in some examples the motor could be positioned above the rail, by positioning the motor below the rail as in the example in FIG. 7 the size and complexity of the design is reduced. The curved rail is fixed to the head chassis. The majority of the mass of the diaphragm blocks is supported by the rail. At some angles of rotation of the radiation head a tangential force of the diaphragm mass will be on the gear teeth.

The motor 34 is attached to a mount that fixes to the head chassis. The mount is adjustable in position to optimise the gear engagement to minimise backlash in the drive system. During use of the beam shaping device, the motor remains in a fixed position relative to the rail and relative to the chassis.

The drive mechanism remains stationary whilst engendering motion of the diaphragm block 16a. This means there are few moving parts, and the mechanism is reliable and robust. This is in contrast to using a linear leadscrew and nut to provide curved motion, which would require the drive assembly to pivot. Pivoting the drive assembly would increase the complexity of the and price of the assembly. The drive assembly described herein is not required to pivot.

The drive mechanism accurately drives the diaphragm along the curved path. The motor 34 rotates the worm screw 32 which moves along teeth of the gear 30. The amount of movement caused per turn of the worm screw 32 is known. Therefore the position of the diaphragm block 16a along the curved path 26 can be accurately controlled, and the desired position of the diaphragm block can accurately be achieved through driving the motor.

Once the diaphragm 16a has been moved to the desired position along the curved path 26, the block must be locked in place so that the position can be maintained whilst the radiation beam is being delivered.

The ratio of the gear can be chosen such that locking the worm screw 32 in place, i.e. not rotating the worm screw, also prevents movement of the gear 30. To provide dynamic self-locking locking an efficiency of below 50% efficiency is required. In one example, an efficiency of below 25% is required. In one example, the gear ratio in the diaphragm drive is around 400:1, with an efficiency (calculated by using the coefficients of friction and the lead angle of the thread on the worm) of about 12%. Dynamic self-locking means that is rotation of the worm screw 32 around its axis is prohibited, and movement of the gear 30 is prohibited. The gear 30, and therefore the diaphragm block 16a, are locked in place.

Established gear calculations can be used to predict the performance of the mechanism and incorporate inefficiency into the design to make the drive system self-locking. This means that once the motor 34 has driven the diaphragm block 32 into position the friction between the gears makes the diaphragm block 32 unable to move under its own mass. This means that a holding brake to stop the diaphragm blocks 16 from moving from a set position would not be required.

Diaphragm blocks weigh a considerable amount more than other components of a beam shaping head, and are the heaviest movable component in the beam shaping head. Therefore it is important to providing a holding mechanism to affix a diaphragm block in place. The holding mechanism must be suitable for holding the weight of the diaphragm block. In known systems a separate brake may be used to hold a diaphragm block in position. By removing the need for a separate brake system, the worm drive reduced the number of parts and the complexity of the beam shaping head.

Therefore the drive mechanism locks the diaphragm 16a in the desired position without the need for holding breaks, meaning that fewer components are required and the system reliability is increased.

This invention uses a worm drive and quadrant gear, where the drive components (motor and worm gear) remain stationary and do not require pivoting to compensate for the arc movement of the Diaphragms thereby significantly reducing the component count, size and cost of the mechanism.

Variations

In other examples the distance d between the source and the focus point is determined using other methods. In other examples the focus point is displaced form the source in a different direction—i.e. other than located on the direct opposite side of the source to the diaphragm. For example, the focus point may be positioned between the diaphragm and the source.

In the figures the diaphragm block moves along a curved rail which defines the curved path, however, the diaphragm block may move along any type of curved path.

In the figures two diaphragm blocks 32 move along a single rail 36 (or 26) to define opposing edges of an aperture. Moving two diaphragm blocks along a single rail reduces the number of components and means that the blocks 32 are aligned. The rail 26 may have a curvature focused on the source of radiation, and therefore both blocks 16a and 16b move along a curved path with the correct curvature. In other examples the diaphragm blocks may move on separate rails.

The above embodiments disclose two opposing diaphragm blocks defining opposing edges of a field. In other examples the disclosure relates to a single diaphragm block driven along a curved path which is defocused, i.e. has a focus point which is offset from the source of radiation.

In other examples the disclosure relates to a beam head with a single diaphragm block having a trimmer attached thereto. In other examples the disclosure relates to a single diaphragm block driven along a curved path using a gear and worm screw. In examples where the disclosure relates to a single diaphragm block, the single diaphragm block delimits one side of the radiation beam and may move in and out of the beam. The skilled person will appreciate a single diaphragm block may operate in a similar fashion to a pair of diaphragm blocks as described above when only one of the two diaphragm blocks is considered. In examples where the disclosure contains a single diaphragm block moving in and out of the radiation beam, there may be present another block which is fixed into place to delimit the other side of the beam in a fixed position.

In some examples, the diaphragm is part of a beam shaping apparatus which comprises two sets of diaphragms. The first set of diaphragms is configured to delimit radiation in the X direction, the second set of diaphragms is configured to delimit the radiation beam in the Y direction. In this implementation both the first and second sets of diaphragms are driven along respective curved paths, each curved path having a focus point which is offset form the source of radiation. The focus point of the curved path of the first pair of diaphragms is may be at a separate location to the focus point of the curved path of the second pair of diaphragm blocks. In this implementation both the first and second sets of diaphragms may be driven along a curved path using a worm screw and gear. That is, a second set of diaphragms is used in place of the multi-leaf collimator in the implementation of shown in the figures.

In another example the diaphragm is part of a primary collimator for collimating a radiation beam. There is provided a radiation head having a primary collimator comprising a set of diaphragm blocks driven along a curved path having a focus point which is offset from the source of radiation. There is provided a radiation head having a primary collimator comprising a set of diaphragms driven along a curved path using a worm screw and gear.

In the implementation described above the radiation source 18 is a linear accelerator. In other examples the radiation source 18 may be a radioactive material or an x-ray gun.

The diaphragm includes a diaphragm block movably attached to a chassis. When the diaphragm block is comprised in a beam shaping device, the chassis is part of a chassis which supports both the multi-leaf collimator and the diaphragm in a fixed relationship. When the beam shaping device is comprised in a radiation head, the chassis is part of a chassis which supports components of the radiation head (source of radiation, primary collimator, beam shaping device) in head is a fixed relationship.

There is provided a beam shaping device comprising a diaphragm block, wherein the diaphragm block is driven along a curved path which is defocused from the source of radiation.

There is also provided a beam shaping device comprising a diaphragm block, the diaphragm block positioned above an MLC, and a trimmer positioned below the MLC and configured to move in unison with the diaphragm block.

There is also provided a beam shaping device comprising a diaphragm block, wherein the diaphragm block is driven along a curved path by a worm drive.

Features of the above aspects can be combined in any suitable manner. It will be understood that the above description is of specific embodiments by way of aspect only and that many modifications and alterations will be within the skilled person's reach and are intended to be covered by the scope of the appendant claims.

In one implementation a beam shaping apparatus configured to collimate a beam of radiation that is directed along a beam axis and has a width transverse to the beam axis in a first direction and a second direction, the apparatus comprising: a multi-leaf collimator for selectively limiting the width of the beam in the first direction; a block collimator for selectively limiting the width of the beam in the second direction, the block collimator comprising at least one diaphragm block movably attached to a chassis; and a drive means comprising: a gear fixedly attached to the diaphragm block; a worm screw; and a motor configured to drive the worm screw; wherein the gear is engaged with the worm screw such that rotation of the worm screw engenders motion of the diaphragm block in the second direction. In use the motor rotates the worm screw such which in turn drives the gear. Since the gear is fixedly attached to the diaphragm block the block moved with the gear to limit the beam in the second direction to an adjustable degree. The diaphragm block is movably attached so that the block is able to move relative to the chassis.

In some implementations the motor is attached to the chassis. In some implementation the motor is attached to the chassis via a mount. In use the motor remains stationary (in the frame of the beam shaping apparatus) and drives the diaphragm block.

Optionally the diaphragm block is movable along a path which is curved in a plane defined by the second direction and the beam axis. The diaphragm block may be movable along a curved rail which is attached to the chassis. The diaphragm block may be slidably attached to the curved rail by a slide, wherein the slide is fixedly attached to the diaphragm block. In an implementation the slide is attached to a side face of the diaphragm block. A side face of the block is a face in a plane parallel to the direction of the beam axis.

The motor may be attached to the chassis and positioned below the rail. Optionally the worm screw is double threaded and engaged with the gear. Double threading reduces system backlash and increase component life. The gear may be a quadrant gear.

In an implementation a first diaphragm block and a second diaphragm block define opposing edges of an aperture to delimit the width of the beam in the second direction. The first and second diaphragm blocks are slidably attached to the same rail.

In an implementation the multi-leaf collimator comprises a first and second bank of leaves defining opposing edges of an aperture to delimit the width of the beam in the first direction. There is also provided radiotherapy device comprising: a source of therapeutic radiation configured to emit a beam of radiation directed along a beam axis; and a beam shaping device according to the disclosure, the beam shaping device configured to collimate the beam of radiation. The diaphragm block of the beam shaping device is configured to move along a curved path which is centred on the source of radiation. The diaphragm block is located between the source of radiation and the multi-leaf collimator.

The following clauses are also provided as part of this disclosure. The features from the clauses may be provided in any conceivable combination.

Clauses

A1. A beam shaping apparatus configured to collimate a beam of radiation that is directed along a beam axis and has a width transverse to the beam axis in a first direction and a second direction, the apparatus comprising:
a multi-leaf collimator for selectively limiting the width of the beam in the first direction;
a block collimator for selectively limiting the width of the beam in the second direction, the block collimator comprising at least one diaphragm block movably attached to a chassis; and
a drive means comprising:
a gear fixedly attached to the diaphragm block;
a worm screw; and
a motor configured to drive the worm screw;
wherein the gear is engaged with the worm screw such that rotation of the worm screw engenders motion of the diaphragm block in the second direction.

A2. An apparatus according to clause A1, wherein the motor is attached to the chassis via a mount.

A3. An apparatus according to any preceding clause, wherein the diaphragm block is movable along a path which is curved in a plane defined by the second direction and the beam axis.

A4. An apparatus according to any preceding clause, wherein the diaphragm block is movable along a curved rail which is attached to the chassis.

A5. An apparatus according to clause A4, wherein the diaphragm block is slidably attached to the curved rail by a slide, wherein the slide is fixedly attached to the diaphragm block.

A6. An apparatus according to clause A5, wherein the slide is attached to a side face of the diaphragm block.

A7. An apparatus according to any of clauses A4 to clause A6, wherein the motor is attached to the chassis and positioned below the rail.

A8. An apparatus according to any preceding clause, wherein the worm screw is double threaded and engaged with the gear.

A9. An apparatus according to any preceding clause, wherein the gear is a quadrant gear.

A10. An apparatus according to any preceding clause, comprising:
a first diaphragm block and a second diaphragm block defining opposing edges of an aperture to delimit the width of the beam in the second direction.

A11. An apparatus according to clause A10, wherein the first and second diaphragm blocks are slidably attached to the same rail.

A12. An apparatus according to any preceding clause, wherein the multi-leaf collimator comprises a first and second bank of leaves defining opposing edges of an aperture to delimit the width of the beam in the first direction.

A13. A radiotherapy device comprising:
a source of therapeutic radiation configured to emit a beam of radiation directed along a beam axis; and
a beam shaping device according to any preceding clause, the beam shaping device configured to collimate the beam of radiation.

A14. A radiotherapy device according to clause A13, wherein the diaphragm block of the beam shaping device is configured to move along a curved path which is centred on the source of radiation.

A15. A radiotherapy device according to clause A13 or A14, wherein the diaphragm block is located between the source of radiation and the multi-leaf collimator.

B1. A radiation head for a radiotherapy device, the radiation head comprising:
a source of radiation configured to emit a beam of radiation; and
beam shaping device for collimating the beam of radiation, the beam shaping device comprising:
a diaphragm comprising a diaphragm block movable along a curved path, the diaphragm block having a flat face focused on a focus point which is offset from the source of radiation.

B2. A radiation head according to clause B1, wherein the diaphragm is below the source of radiation and the focus point is above the source of radiation B3. A radiation head according to clause B1 or B2 wherein the focus point is offset from the radiation source by a distance d.

B4. A radiation head according to any of clauses B1 to B3, wherein the source is configured to emit a beam of radiation that is directed along a beam axis and has a width transverse to the beam axis in a first direction and a second direction, wherein the diaphragm block selectively limits the width of the beam in the first direction.

B5. A radiation head according to clause B4 further comprising a multi-leaf collimator for selectively limiting the width of the beam in the second direction.

B6. A radiation head according to clause B5 wherein the diaphragm is positioned between the source and the multi-leaf collimator.

B7. A radiation head according to any of clauses B1 to B6 wherein the diaphragm block is slidably attached to a curved rail which defines the curved path.

B8. A radiation head according to any of clauses B1 to B7, wherein the diaphragm comprises a first diaphragm block and a second diaphragm block defining opposing edges of an aperture to delimit the beam.

B9. A radiation head according to clause B8 wherein the first diaphragm block and the second diaphragm block are movable along the same curved path and focused on the same focus point.

B10. A radiation head according to any of clauses B1 to B9, wherein the source comprises a nominal disc, and at the maximum field angle the first block is focused on a first edge of the nominal disc and the second block is focused on a second edge of the nominal disc.

B11. A radiotherapy apparatus comprising:
a rotatable gantry;
a radiation head according to any preceding clause, wherein the radiation head is fixedly attached to the rotatable gantry.

C1. A beam shaping device for collimating a beam of radiation directed along a beam axis, the beam shaping device comprising:
a diaphragm comprising:
at least one diaphragm block movable to selectively limit the beam of radiation; and
a trimmer movable to intercept the penumbra region of a beam collimated by the diaphragm block; and
a multi-leaf collimator positioned between the diaphragm block and the trimmer.

C2. A beam shaping device according to clause C1, wherein the trimmer is fixedly attached to the diaphragm block.

C3. A beam shaping device according to clause C2, wherein the leading edge of the trimmer is aligned with the leading edge of the diaphragm block.

C4. A beam shaping device according to clause C2 or clause C3 wherein movement of the diaphragm into the beam of radiation causes movement of the trimmer into the beam of radiation by a corresponding degree.

C5. A beam shaping device according to any of clauses C1 to C4 wherein the trimmer is attached to the diaphragm block by a rigid arm.

C6. A beam shaping device according to any of clauses C1 to C5 wherein the trimmer is made from tungsten.

C7. A beam shaping device according to any of clauses C1 to C6 wherein the diaphragm block is configured to move on a curved path with the inner face focused on a focus point, and wherein the trimmer is configured to move on a curved path with the inner face focused on the focus point.

C8. A beam shaping device according to any of clauses C1 to C7 configured to collimate a beam of radiation having a width transverse to the beam axis in a first direction and a second direction, wherein the diaphragm block selectively limits the width of the beam in the first direction.

C9. A beam shaping device according to clause C8, wherein the multi-leaf collimator selectively limits the width of the beam in the second direction.

C10. A beam shaping device according to any of clauses C1 to C4, wherein the diaphragm comprises a first diaphragm block and a second diaphragm block defining opposing edges of an aperture.

C11. A beam shaping device according to clause C10, wherein the diaphragm comprises a first trimmer and a second trimmer, each trimmer movable to intercept the penumbra region of a beam collimated by the respective diaphragm block.

C12. A beam shaping device according to any of clauses C1 to C4, further comprising a first drive means configured to move the diaphragm block, and a second drive means configured to move the trimmer.

C13. A beam shaping device according to clause C12, further comprising a controller configured to control movement of the diaphragm block and the trimmer to move in unison to delimit the beam to the same degree.

C14. A radiation head comprising:
a source of radiation configured to emit a beam of radiation directed along a beam axis; and
a beam shaping device according to any preceding clause configured to collimate the beam of radiation.

C15. A radiation head according to clause C14 wherein the diaphragm block is positioned between the source and the multi-leaf collimator.

C16. A radiotherapy device comprising the radiation head of clauses C14 or C15, wherein the radiation head is configured to rotate around an axis which is perpendicular to the beam axis.

The invention claimed is:

1. A radiation head for a radiotherapy device, the radiation head comprising:
a source of radiation configured to emit a beam of radiation;
a beam shaping device for collimating the beam of radiation, the beam shaping device comprising:
a multi-leaf collimator; and
a diaphragm positioned between the source of radiation and the multi-leaf collimator, the diaphragm comprising a diaphragm block having a flat face, the diaphragm block moveable along a curved path with the flat face focused on a focus point which is above the source of radiation such that a lower portion of the diaphragm block extends into the beam by a greater amount than an upper portion of the diaphragm block.

2. The radiation head according to claim 1, wherein the diaphragm is located below the source of radiation.

3. The radiation head according to claim 1, wherein the focus point is offset from the source of radiation by a distance d.

4. The radiation head according to claim 1, wherein the source of radiation is configured to emit the beam of radiation directed along a beam axis and having a width transverse to the beam axis in a first direction and a second direction, wherein the diaphragm block selectively limits the width of the beam in the first direction.

5. The radiation head according to claim 1, wherein the beam shaping device defines an aperture to delimit the beam, and wherein the diaphragm block spans an edge of the aperture.

6. The radiation head according to claim 1, wherein the diaphragm block is slidably attached to a curved rail which defines the curved path.

7. The radiation head according to claim 1, wherein the diaphragm comprises a first diaphragm block and a second diaphragm block defining opposing edges of an aperture to delimit the beam.

8. The radiation head according to claim 4, wherein the multi-leaf collimator is configured to selectively limit the width of the beam in the second direction.

9. The radiation head according to claim 7, wherein the first diaphragm block and the second diaphragm block are movable along the curved path and focused on the focus point.

10. The radiation head according to claim 7, wherein the source of radiation comprises:
a nominal disc, wherein at a maximum field angle the first diaphragm block is focused on a first edge of the nominal disc and the second diaphragm block is focused on a second edge of the nominal disc.

11. A radiotherapy apparatus comprising:
a rotatable gantry;
a radiation head fixedly attached to the rotatable gantry, the radiation head comprising:
a source of radiation configured to emit a beam of radiation;
a beam shaping device for collimating the beam of radiation, the beam shaping device comprising:
a multi-leaf collimator; and
a diaphragm positioned between the source of radiation and the multi-leaf collimator, the diaphragm comprising a diaphragm block having a flat face, the diaphragm block movable along a curved path with the flat face focused on a focus point which is above the source of radiation such that a lower portion of the diaphragm block extends into the beam by a greater amount than an upper portion of the diaphragm block.

12. The radiotherapy apparatus of claim 11, wherein the diaphragm is located below the source of radiation.

13. The radiotherapy apparatus of claim 11, wherein the focus point is offset from the source of radiation.

14. The radiotherapy apparatus of claim 11, wherein the beam shaping device defines an aperture to delimit the beam, and wherein the diaphragm block spans an edge of the aperture.

15. The radiotherapy apparatus of claim 11, wherein the diaphragm block is slidably attached to a curved rail which defines the curved path.

16. The radiotherapy apparatus of claim 11, wherein the diaphragm comprises a first diaphragm block and a second diaphragm block defining opposing edges of an aperture to delimit the beam.

17. A radiotherapy apparatus comprising:
   a rotatable gantry; and
   a radiation head fixedly attached to the rotatable gantry, the radiation head comprising:
   a source of radiation configured to emit a beam of radiation; and
   a beam shaping device for collimating the beam of radiation that is directed along a beam axis and has a width transverse to the beam axis in a first direction and a second direction, the beam shaping device comprising:
   a multi-leaf collimator;
   a diaphragm positioned between the source of radiation and the multi-leaf collimator, the diaphragm comprising a diaphragm block movable along a curved path, the diaphragm block having a flat face focused on a focus point which is offset from the source of radiation; and
   a drive member, the drive member comprising:
   a gear fixedly attached to the diaphragm block;
   a worm screw; and
   a motor configured to drive the worm screw, wherein the gear is engaged with the worm screw such that rotation of the worm screw causes motion of the diaphragm block in the second direction.

18. The radiotherapy apparatus of claim 17, wherein the diaphragm block is movably attached to a chassis, and wherein the motor is attached to the chassis via a mount.

19. The radiotherapy apparatus of claim 17, wherein the curved path is a curved rail, wherein the diaphragm block is slidably attached to the curved rail by a slide, and wherein the slide is fixedly attached to the diaphragm block.

20. The radiotherapy apparatus of claim 18, wherein the diaphragm block is movable along a curved rail which is attached to the chassis.

* * * * *